United States Patent [19]

Horvath et al.

[11] 4,175,865

[45] Nov. 27, 1979

[54] SMOKE DETECTOR

[75] Inventors: Zoltan Horvath, Männedorf; Erwin Tresch, Zollikon, both of Switzerland

[73] Assignee: Cerberus AG, Männedorf, Switzerland

[21] Appl. No.: 777,396

[22] Filed: Mar. 14, 1977

[30] Foreign Application Priority Data

Apr. 5, 1976 [CH] Switzerland .......................... 4138/76

[51] Int. Cl.² .............................................. G01N 21/26

[52] U.S. Cl. .................................... 356/338; 250/227; 250/574; 340/630; 356/439

[58] Field of Search ............... 356/103, 104, 207, 338, 356/438, 439; 250/227, 574; 340/237 S, 630

[56] References Cited

U.S. PATENT DOCUMENTS

| | | | |
|---|---|---|---|
| 3,310,680 | 3/1967 | Hasegawa | 356/104 |
| 3,708,675 | 1/1973 | Tashiro et al. | 250/574 |
| 3,790,289 | 2/1974 | Schmidt | 356/207 |
| 3,806,256 | 4/1974 | Ishak | 356/209 |
| 3,878,399 | 4/1975 | Higuchi et al. | 250/227 |
| 3,986,778 | 10/1976 | Mathisen et al. | 250/227 |
| 3,990,851 | 11/1976 | Gross et al. | 356/103 |
| 4,017,186 | 4/1977 | Shofner et al. | 356/103 |

FOREIGN PATENT DOCUMENTS

| | | | |
|---|---|---|---|
| 2328888 | 12/1973 | Fed. Rep. of Germany | 356/207 |

*Primary Examiner*—John K. Corbin
*Assistant Examiner*—R. A. Rosenberger
*Attorney, Agent, or Firm*—Werner W. Kleeman

[57] ABSTRACT

An optical smoke detector comprising a radiation source transmitting radiation throughout a predetermined spatial region and at least one radiation receiver to which there is delivered the radiation scattered by particles located in the radiation region. One or a number of elements conducting radiation by reflection are provided and arranged such that they remove radiation, which has been forwardly scattered at an acute angle with respect to the radiation direction, at a substantially ring-shaped zone about the region of direct radiation and delivers such removed forwardly scattered radiation to the radiation receiver.

23 Claims, 7 Drawing Figures

SMOKE DETECTOR

BACKGROUND OF THE INVENTION

The present invention relates to a new and improved construction of an optical smoke detector of the type comprising a radiation source which transmits radiation throughout a predetermined spatial region, and at least one radiation receiver to which there is delivered the radiation which is scattered by particles located in the radiation region.

With smoke detectors of this general character it is possible to select the radiation in the visible, infrared or ultraviolet wavelength range, depending upon the nature of the smoke particles to be detected. With such smoke detectors, as utilized for instance in the fire alarm art, the radiation receiver is not directly impinged or irradiated, rather arranged externally of the radiation range or region such that it only then receives radiation when radiation-scattering particles enter the radiation path and cause scattering of the radiation. Typical of such type optical smoke detectors are those disclosed in the commonly assigned U.S. Pat. No. 3,316,410, granted Apr. 25, 1976 and U.S. Pat. No. 3,760,395, granted Sept. 18, 1973, to which reference may be readily had, and the disclosure of which is incorporated herein by reference. As soon as the scattered radiation intensity, received by the radiation receiver, has attained a certain value, then a signal is delivered by a suitable evaluation circuit, for instance in the manner taught, by way of example, in Swiss Pat. No. 417,405, or the Japanese petty patent publications Sho No. 47-21577, 47-21578, and 48-2687 and the Japanese patent publication Sho No. 47-32797, the disclosure of which is also incorporated herein by reference.

Heretofore known smoke detectors of this general character transmit the radiation by means of an optical system into a measuring chamber. The radiation receiver is arranged transversely with respect to the radiation direction such that it preferably can receive radiation which is scattered through an angle of 90°. The efficiency of such arrangement is, however, relatively poor, since the irradiation or impingement of the radiation receiver is extremely small when there prevails low smoke density in the measuring chamber. Therefore, such smoke detectors are associated with the drawback that when used as fire alarms they do not react early enough to the first traces of smoke originating when a fire breaks out.

It has already been attempted to make use of the fact that for most types of particles which are to be detected the forward radiation scattering—during which the receiving direction forms an acute angle with the radiation direction—is greater than the sideward scattering or rearward scattering. Hence, the radiation receiver is dispositioned such that it is just still located externally of the radiation bundle. However, the sensitivity increase which can be obtained with such smoke detectors falls within narrow limits, since even here there is only used a very small part of the scattered radiation. Additionally, the radiation must be focused or bundled extremely well in order that the radiation receiver is not impinged by direct peripheral or marginal radiation, rendering such equipment quite expensive and difficult to adjust.

SUMMARY OF THE INVENTION

Hence, with the foregoing in mind it is a primary object of the present invention to provide a new and improved construction of smoke detector which is not associated with the aforementioned drawbacks and limitations of the prior art proposals.

Another and more specific object of the present invention aims at eliminating the aforementioned drawbacks and providing an optical smoke detector possessing improved efficiency, correspondingly reduced power requirements and increased functional reliability, and which, when used as a fire alarm or indicator, gives a signal in a positive manner and at an incipient stage during the development of a fire, specifically in the presence of relatively low smoke concentration.

Now in order to implement these and still further objects of the invention, which will become more readily apparent as the description proceeds, the optical smoke detector of this development is manifested by the features that there are provided one or a number of elements which conduct radiation by reflection and are arranged such that the radiation which is forwardly scattered at an acute angle with respect to the radiation direction is removed by such radiation-conducting elements (sometimes referred to herein also as "reflection radiation-conducting elements") at a substantially ring-shaped zone about the direct radiation and delivered to a radiation receiver.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1A:
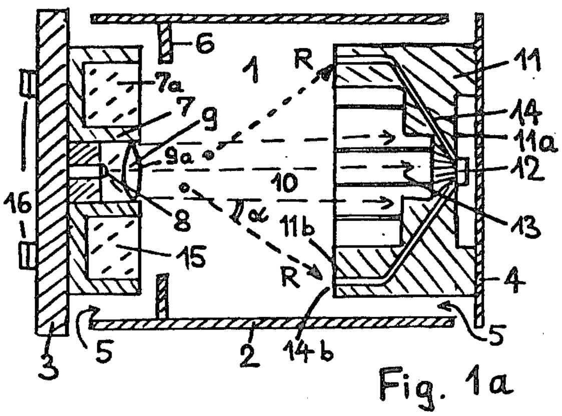
FIG. 1*a* is a longitudinal sectional view through a first embodiment of optical smoke detector constructed according to the invention.

Describing now the drawings, it is to be understood that only enough of the construction of the various embodiments of optical smoke detectors, constructed according to the invention, have been shown in the drawings to enable those skilled in the art to readily understand the underlying principles and concepts of the present invention. Turning attention therefore to the first illustrated embodiment of FIG. 1*a* it will be seen that such optical smoke detector comprises a measuring chamber 1 which is accessible to the air or atmosphere being monitored and enclosed by a substantially tubular-shaped housing 2 which is closed at both ends by means of the base plates 3 and 4. The base plates 3 and 4 are mounted at the tubular-shaped housing 2 such that between said base plates 3 and 4 and said housing 2 there are formed air entry or inlet slots 5 or equivalent structure, by means of which the ambient air or atmosphere which is being monitored can penetrate into the interior of the measuring chamber or compartment 1. It is advantageous to deflect the incoming air stream and to that end there may be possibly provided additional baffles 6, so that there is suppressed direct light incidence from the outside.

Mounted upon the one base plate 3 is a holder body or a holder 7 in which there is arranged a suitable radiation source 8. In principle, the construction of the radiation source 8 is optional, and, for instance, it may be constituted by an incandescent lamp, a gas discharge lamp or a ligh-emitting semiconductor, for instance a gallium arsenide diode, so-called LEDs. By means of a suitable optical system 9, typically for instance a lens 9*a*, the radiation is transmitted in a bundled or focused manner into a radiation region 10. Instead of the foregoing construction it is, however, possible to employ other optical means, for instance reflectors, or, the radiation source can be a light source having a preferred radiation direction, for instance a laser diode. Details of other possible advantageous constructions of radiation sources constitute the subject matter of our commonly assigned, copending United States application, Ser. No. 777,397, filed Mar. 14, 1977, and entitled "Smoke Detector", to which reference may be readily had, and the disclosure of which is incorporated herein by reference.

At the oppositely situated base plate 4 there is provided a further holder component or holder 11. Holder 11 carries at its rear face 11*a* a radiation receiver 12 which is not accessible to the direct radiation i.e. not directly impinged by such direct radiation, and the sensitivity of which is tuned or matched to the wavelength of the radiation. The front side or face 11*b* of the holder or support element 11, which confronts the radiation source 8, is formed at its central region which is impinged by the direct radiation in a suitable manner so as to be radiation-absorbant, for instance in the manner of a light trap 13, so that as little as possible of the incident radiation will be again reflected. The direct radiation region or range 10 is surrounded by a rim or crown of radiation-conducting elements 14, which, for instance, can be constituted by conventional light-conducting or photoconductive fibers 14*a*, for instance optical fibers. The inlet openings 14*b* of these light-conducting fibers 14*a* are dispositioned essentially in a substantially ring-shaped zone about the direct radiation region 10, so that radiation which is forwardly scattered at particles located in the radiation region 10 impinges at such inlet openings 14*b*. Instead of using light-conducting fibers which are totally reflective for the light it is also possible to use open pipes or tubes which are also reflectively coated or otherwise rendered reflective at the inside.

A particularly good efficiency is realized if the angle $\alpha$ of the radiation scattered by the particles at the central radiation region 10 and formed with respect to the direction of the direct radiation, is in the order of magnitude of about 5°–15°. In this way there is assured that also in the absence of non-ideal focusing or bundling of the radiation at the peripheral or marginal regions, direct radiation cannot impinge at the inlet openings 14*b* of the fibers 14*a*, and thus, there is obtained an optimum signal-to-noise ratio.

Figure 1B:
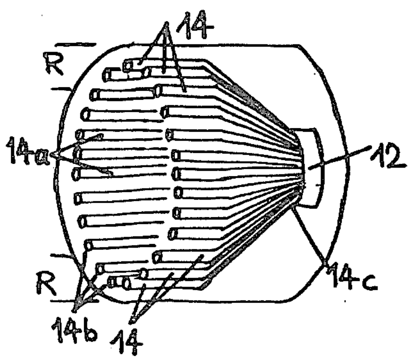
FIG 1*b* illustrates details of part of the optical smoke detector shown in FIG. 1.

As illustrated in perspective view in FIG. 1*b*, the light-conducting fibers 14*a* lead to the common radiation source 12 at their rear ends 14*c*. With this arrangement there is beneficially obtained the result that with only a single radiation receiver 12 there is received scattered radiation from the entire optimum zone about the direct radiation region of the scattered radiation and such can be delivered to the receiver 12. This effect can be even further improved if there is employed instead of only a single rim of light-conducting fibers a number of such, typically a plurality of superimposed layers of such rims of light-conducting fibers.

The radiation receiver 12 like the radiation source 8 is operatively connected with a suitable electronic control and evaluation circuit 15 which may be cast in a hollow space 7*a* of the holder or support element 7. This control and evaluation circuit 15 can be of conventional design, for instance as disclosed in certain of the previously mentioned prior art patents, and can be constructed such that the radiation source 8 can be operated intermittently and the radiation receiver 12 thus functions in a coincidence circuit. By means of the contacts 16, which may be for instance in the form of a bayonet- or pin contact construction, the electronic circuit 15 can be operatively connected by means of conductors or lines with a central signalling station, as is well known in this particular art.

Figure 2:
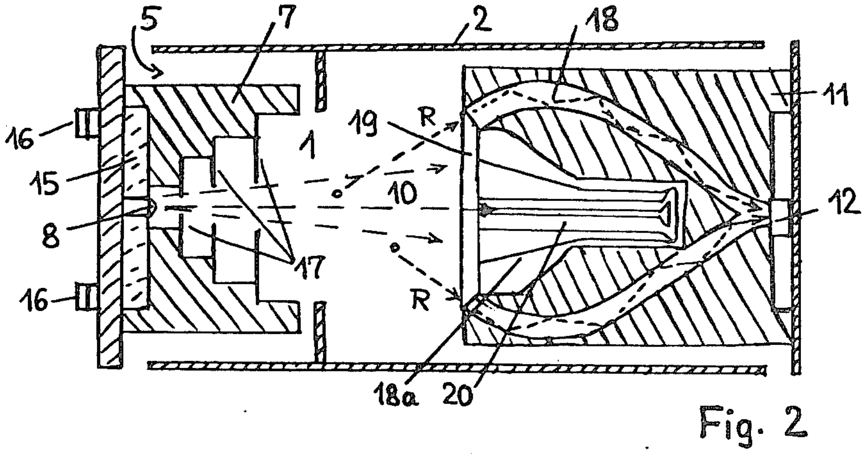
FIG. 2 is a longitudinal sectional view of a second embodiment of optical smoke detector.

Now with the modified exemplary embodiment illustrated in FIG. 2, wherein it is to be appreciated that generally the same reference characters have been used for the same or analogous components, there is employed a smoke detector having a radiation source 8 possessing directional characteristics or pattern, for instance a laser diode. To obtain a limited or confined radiation region 10, in this case, there are not required any optical focusing or bundling means, rather it is sufficient to use a system of diaphragms 17 or equivalent structure which are provided at the appropriately constructed holder or support element 7.

Now with this embodiment there is located at the side of the receiver 12, instead of the light-conducting fibers 14*a* of the optical smoke detector considered above in conjunction with FIGS. 1*a* and 1*b*, a substantially bulb-shaped light conductor or photoconductor 18. Once again, this light conductor 18 conducts, by means of internal total reflection, the scattered radiation which arrives at the substantially ring-shaped inlet zone 19 to the radiation receiver 12. With this arrangement there is realized a particularly simple construction for capturing the scattered radiation in a ring-shaped zone 19 about the direct radiation region 10.

The central region 18*a* within the bulb-shaped light or radiation conductor 18, and which is impinged by the radiation emanating from the direct radiation region 10, is constructed as a so-called Rayleigh horn 20 which provides for particularly good extinguishment of the incident radiation and an extremely low reflection.

Figure 3:
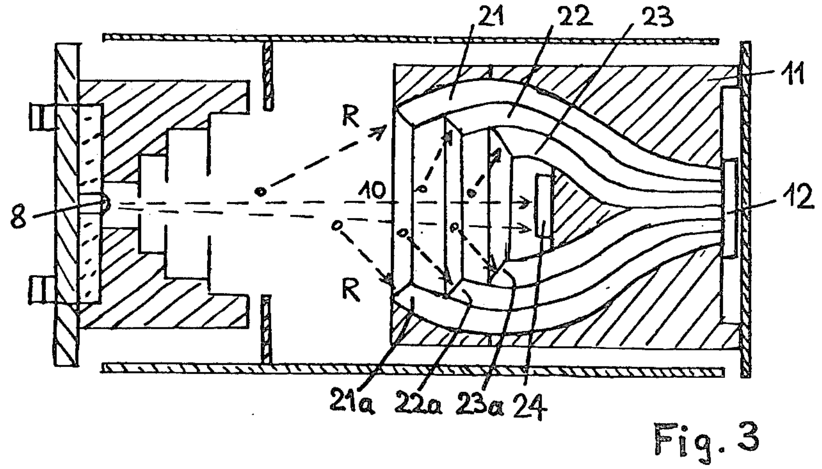
FIG. 3 is a longitudinal sectional view of a third embodiment of optical smoke detector.

The modified version of optical smoke detector illustrated in FIG. 3 differs from the previously discussed embodiment of FIG. 2 only in terms of the construction at the side of the receiver in that, here, there are provided a number of superimposed substantially bulb-shaped light or radiation conductors 21, 22 and 23 with inset or rearwardly displaced opening rings 21*a*, 22*a* and 23*a* respectively, which similarly conduct the scattered radiation once again to a single receiver element 12. Due to this arrangement there is obtained the result that an even greater range of scattering of the scattered radiation is detected by the light-conducting elements or radiation conductors 21, 22 and 23 and can be transmitted to the radiation receiver 12. As a result, the efficiency of the optical smoke detector is further improved in relation to the preceding discussed embodiments.

A further difference which is present with this variant construction is that, for this embodiment, there is not provided at the center of the radiation region 10 any light or radiation trap 13, as was the case for the embodiment of FIGS. 1*a* and 1*b*, rather here there is arranged at such location a further radiation receiver 24. Radiation receiver 24 is electrically coupled with the scattered radiation receiver 12 in a differential—or quotient circuit, for instance as disclosed in German petty patent No. G 76.09 014.7 to which reference may be readily had, and the disclosure of which is incorporated herein by reference. In this case use is made of the fact that smoke not only causes radiation scattering, but likewise an extinction of radiation at the center of the radiation region 10. Therefore, in the described manner the sensitivity of the arrangement can be further improved by mounting the further radiation receiver 24 in addition to the scattered radiation receiver 12.

Figure 4:
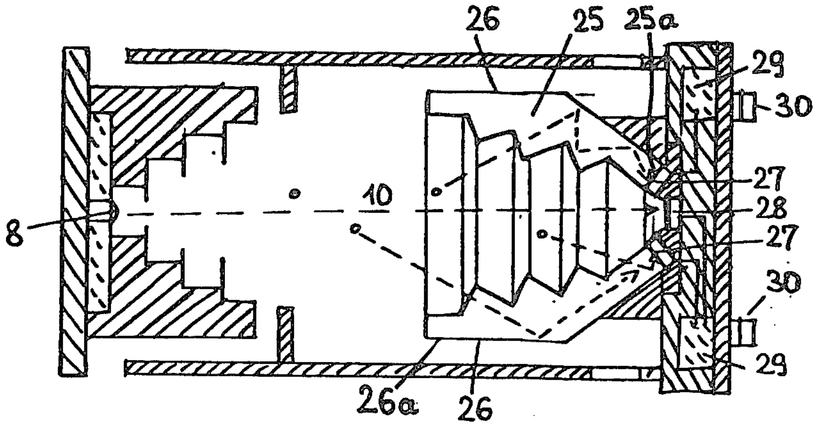
FIG. 4 is a longitudinal sectional view of a fourth embodiment of optical smoke detector.

Continuing, the further exemplary embodiment of optical smoke detector depicted in FIG. 4, in principle, is nothing more than a simplified, easier and less expensive to manufacture construction of the embodiment of FIG. 3 previously discussed. In this case, the multiple superimposed bulb-shaped light conductors or shells 21, 22, 23 and so forth of the arrangement of FIG. 3, are replaced by a single light- or radiation conducting element 25 and there is dispensed with the need for any partition or separating walls for the individual light conductors 21, 22, 23 etc. Naturally, the efficiency is somewhat less than when using light-conducting glass fibers or glass shells, where the radiation conductance occurs by means of total reflections. However, for compensation purposes it is possible to provide the outer surface 26 of the light-conducting element or body 25 with a reflective coating, as generally indicated by reference character 26*a*, so that also in this case there is insured for satisfactory collection of the radiation. A particularly advantageous construction contemplates forming the entire light-conducting body or element 25 of an easy to machine material, for instance the material commercially available under the well known trademark "PLEXIGLAS".

At its rear end 25*a* the light-conducting body 25 carries a substantially ring-shaped scattered light- or scattered radiation- receiver 27, whereas at the center of the radiation region 10 there is again arranged a radiation receiver 28 for the direct radiation. In this exemplary embodiment part of the electronic evaluation circuitry 29 and the connection contacts 30 are located at the receiver side.

Figure 5:
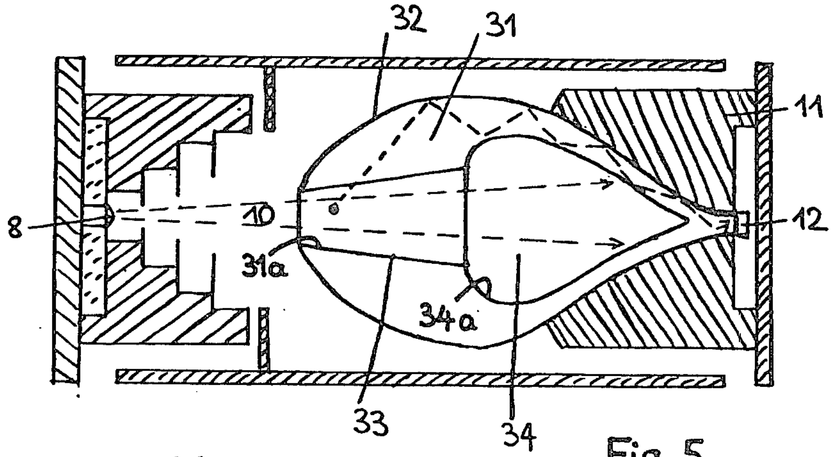
FIG. 5 is a longitudinal sectional view of a fifth embodiment of optical smoke detector.

The exemplary embodiment shown in FIG. 5 likewise possesses a light-conducting body 31, formed of one-piece, for instance from a light-conducting glass or transparent plastic. The outer surface 32 of the body or element 31 has the shape of a slim bulbous member or bulb. At the center of such body 31 there is provided a bore 31*a* having a slightly conical inner surface 33 and accommodated to the aperture angle of the radiation region 10. This slightly conical inner surface 33 terminates in a likewise substantially bulb-shaped absorption space or chamber 34, the inner surface 34*a* of which can be blackened or reflectively coated. When constructing the light-conducting body 31 of a markedly refractive material, for instance a suitable glass, then the outer surface 32 functions as a totally reflective surface at least for flat incident radiation, that is to say, for forwardly scattered radiation or light, and this is also the case for the inner surface 34*a* of the absorption space 34. When formed of transparent plastic, for instance the previously mentioned trademarked product "PLEXIGLAS", it is advisable to reflectively coat the outer surface 32 of such light-conducting body 31. Here also a radiation receiver 12 is mounted at the tip or apex of the bulb-shaped light-conducting body 31 in order to collect the scattered radiation entering through the inner surface 33, whereas the direct radiation which arrives at the absorption space or chamber 34 is absorbed. Since with this arrangement the light-conducting body or element 31 encloses a large part of the radiation region 10, a particularly large proportion of the scattered radiation is captured or taken-up and by virtue of the especially flat bulbous-shape of the light-conducting body 31 is transmitted with good efficiency to the radiation receiver 12. An optical smoke detector constructed in accordance with the teachings of this embodiment, notwithstanding its simple construction, possesses a particularly large sensitivity.

Figure 6:
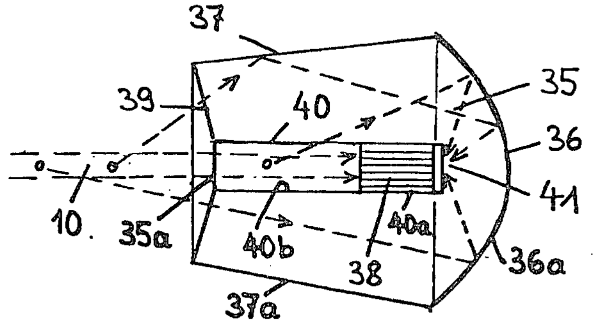
FIG. 6 schematically illustrates a further construction of radiation-conducting body which can be used in the optical smoke detectors of the invention.

Finally, FIG. 6 illustrates another form of a radiation- or light-conducting body or element 35 formed of transparent plastic. The rear surface or face 36 of this body 35 possesses an approximately paraboloid-shaped configuration and is reflectively coated, as generally indicated by reference character 36*a*. The side surfaces 37 of body 35 are of substantially conical configuration and likewise reflectively coated, as generally indicated by reference character 37*a*, whereas the front surface or face 39 can be flat or possess a truncated cone configuration. At its central region 35*a* the body 35 possesses a substantially cylindrical or slightly tapered bore 40 for the reception of the direct radiation emanating from the radiation region 10, this radiation being absorbed by a radiation or light trap 38 mounted at the rear end 40*a* of the bore 40. The wall 40*b* of the bore 40 is radiation pervious, and at the rear face or end of the radiation trap 38 there is mounted the radiation receiver 41 which only receives radiation from the paraboloid-shaped rear face or surface 36 of the radiation-conducting body 35. Therefore, with this arrangement there is obtained the result that there is made use of radiation which is scattered forwardly at an acute angle practically exclusively from the radiation bundle or region 10. A particular advantageous feature of this embodiment is its short structural length.

While there are shown and described present preferred embodiments of the invention, it is to be distinctly understood that the invention is not limited thereto, but may be otherwise variously embodied and practiced within the scope of the following claims.

Accordingly, what we claim is:

1. An optical smoke detector comprising:

a measuring chamber for receiving gases which are to be analysed for the presence of particles stemming from a combustion process;

a radiation source located in said measuring chamber for transmitting radiation through a predetermined spatial region defining a region of direct radiation;

at least one radiation receiver positioned in said measuring chamber for receiving radiation scattered by the particles located in said region of direct radiation;

a plurality of radiation-conducting elements for conducting radiation by reflection positioned in said measuring chamber for removing radiation in a substantially ring-shaped zone located about said region of direct radiation which has been scattered forwardly at an acute angle with respect to the radiation direction and for delivering such removed forwardly scattered radiation receiver; and said radiation-conducting elements comprising substantially bulb-shaped elements possessing substantially ring-shaped inlet openings and an apex portion arranged in spaced relationship from said substantially ring-shaped inlet openings;

said substantially ring-shaped inlet openings being located at a substantially ring-shaped zone disposed about the region of the direct radiation; and said apex portion being located adjacent said radiation receiver.

2. The optical smoke detector as defined in claim 1, further including:

an additional radiation receiver for the reception of direct radiation arranged substantially at a central region of said at least one radiation conducting element.

3. The optical smoke detector as defined in claim 1, further including:

radiation trap means arranged substantially at the central region of said radiation-conducting elements.

4. The optical smoke detector as defined in claim 1, further including:

means for directing the radiation transmitted by the radiation source at a central radiation region defining said region of direct radiation within said ring-shaped zone.

5. The optical smoke detector as defined in claim 1, further including:

means for confining the radiation transmitted by the radiation source substantially at a central radiation region defining said region of direct radiation within said substantially ring-shaped zone;

said confining means comprising diaphragm means.

6. An optical smoke detector comprising:

a measuring chamber for receiving gases which are to be analysed for the presence of particles stemming from a combustion process;

a radiation source located in said measuring chamber for transmitting radiation through a predetermined spatial region defining a region of direct radiation;

at least one radiation receiver positioned in said measuring chamber for receiving radiation scattered by the particles located in said region of direct radiation;

at least one element for conducting radiation by reflection positioned in said measuring chamber for removing radiation in a substantially ring-shaped zone located about said region of direct radiation which has been scattered forwardly at an acute angle with respect to the radiation direction and for delivering such removed forwardly scattered radiation to said radiation receiver;

said radiation-conducting element comprises at least one substantially bulb-shaped element having a substantially ring-shaped inlet opening and in spaced relationship therefrom an apex portion;

said substantially ring-shaped inlet opening being disposed at a substantially ring-shaped zone located about said region of direct radiation; and said apex portion being arranged adjacent said radiation receiver.

7. The optical smoke detector as defined in claim 6, further including:

radiation trap means arranged substantially at the central region of said radiation-conducting element.

8. The optical smoke detector as defined in claim 6, further including:

means for directing the radiation transmitted by the radiation source at a central radiation region defining said region of direct radiation within said ring-shaped zone.

9. The optical smoke detector as defined in claim 6, further including:

means for confining the radiation transmitted by the radiation source substantially at a central radiation region defining said region of direct radiation within said substantially ring-shaped zone;

said confining means comprising diaphragm means.

10. An optical smoke detector comprising:

a measuring chamber for receiving gases which are to be analysed for the presence of particles stemming from a combustion process;

a radiation source located in said measuring chamber for transmitting radiation through a predetermined spatial region defining a region of direct radiation;

at least one radiation receiver positioned in said measuring chamber for receiving radiation scattered by the particles located in said region of direct radiation;

at least one element for conducting radiation by reflection positioned in said measuring chamber for removing radiation in a substantially ring-shaped zone located about said region of direct radiation which has been scattered forwardly at an acute angle with respect to the radiation direction and for delivering such removed forwardly scattered radiation to said radiation receiver;

said radiation-conducting element comprises a transparent body possessing a radiation reflecting-outer surface and substantially step-like ring-shaped inlet openings externally of the region of the direct radiation.

11. The optical smoke detector as defined in claim 10, further including:

radiation trap means arranged substantially at the central region of said radiation-conducting element.

12. The optical smoke detector as defined in claim 10, further including:

means for directing the radiation transmitted by the radiation source at a central radiation region defining said region of direct radiation within said ring-shaped zone.

13. The optical smoke detector as defined in claim 10, further including:

means for confining the radiation transmitted by the radiation source substantially at a central radiation region defining said region of direct radiation within said substantially ring-shaped zone;

said confining means comprising diaphragm means.

14. The optical smoke detector as defined in claim 10, further including:

an additional radiation receiver for the reception of direct radiation arranged substantially at a central region of said at least one radiation-conducting element.

15. An optical smoke detector comprising:
a measuring chamber for receiving gases which are to be analysed for the presence of particles stemming from a combustion process;
a radiation source located in said measuring chamber for transmitting radiation through a predetermined spatial region defining a region of direct radiation;
at least one radiation receiver positioned in said measuring chamber for receiving radiation scattered by the particles located in said region of direct radiation;
at least one element for conducting radiation by reflection positioned in said measuring chamber for removing radiation in a substantially ring-shaped zone located about said region of direct radiation which has been scattered forwardly at an acute angle with respect to the radiation direction and for delivering such removed forwardly scattered radiation to said radiation receiver;
said radiation-conducting element comprises a body possessing a substantially bulb-shaped outer surface and an apex portion;
means defining an absorption space for radiation arranged within said body;
said body being provided with a bore communicating with said absorption space and surrounding the region of direct radiation; and
said apex portion of said body being arranged adjacent said radiation receiver.

16. The optical smoke detector as defined in claim 15, wherein:
said bore possesses a substantially cylindrical configuration.

17. The optical smoke detector as defined in claim 15, wherein:
said bore possesses a slightly conically tapered configuration.

18. The optical smoke detector as defined in claim 15, further including:
radiation trap means arranged substantially at the central region of said radiation-conducting element.

19. The optical smoke detector as defined in claim 15, further including:
means for directing the radiation transmitted by the radiation source at a central radiation region defining said region of direct radiation within said ring-shaped zone.

20. The optical smoke detector as defined in claim 15, further including:
means for confining the radiation transmitted by the radiation source substantially at a central radiation region defining said region of direct radiation within said substantially ring-shaped zone;
said confining means comprising diaphragm means.

21. An optical smoke detector comprising:
a measuring chamber for receiving gases which are to be analysed for the presence of particles stemming from a combustion process;
a radiation source located in said measuring chamber for transmitting radiation through a predetermined spatial region defining a region of direct radiation;
at least one radiation receiver positioned in said measuring chamber for receiving radiation scattered by the particles located in said region of direct radiation;
only one element for conducting radiation by reflection positioned in said measuring chamber for removing radiation in a substantially ring-shaped zone located about said region of direct radiation which has been scattered forwardly at an acute angle with respect to the radiation direction and for delivering such removed forwardly scattered radiation to said radiation receiver;
said radiation-conducting element comprising a transparent body possessing a radiation reflecting-outer surface, said radiation-conducting element having a central bore for capturing direct radiation and a substantially ring-shaped inlet opening located around said bore and externally of the region of the direct radiation.

22. The optical smoke detector as defined in claim 21, further including:
radiation trap means arranged within said bore substantially at the central region of said radiation conducting element.

23. The optical smoke detector as defined in claim 22, wherein:
said radiation receiver being arranged at a rear face of said radiation trap means and receiving radiation travelling in a direction opposite to the direction of movement of the direct radiation;
said transparent body including a radiation reflecting rear surface for reflecting the forwardly scattered radiation onto said radiation receiver.

* * * * *